Nov. 14, 1933.    J. WINDISCH    1,935,138
APPARATUS FOR USE IN ELECTRICALLY STUNNING ANIMALS
Filed Oct. 12, 1932    2 Sheets-Sheet 1
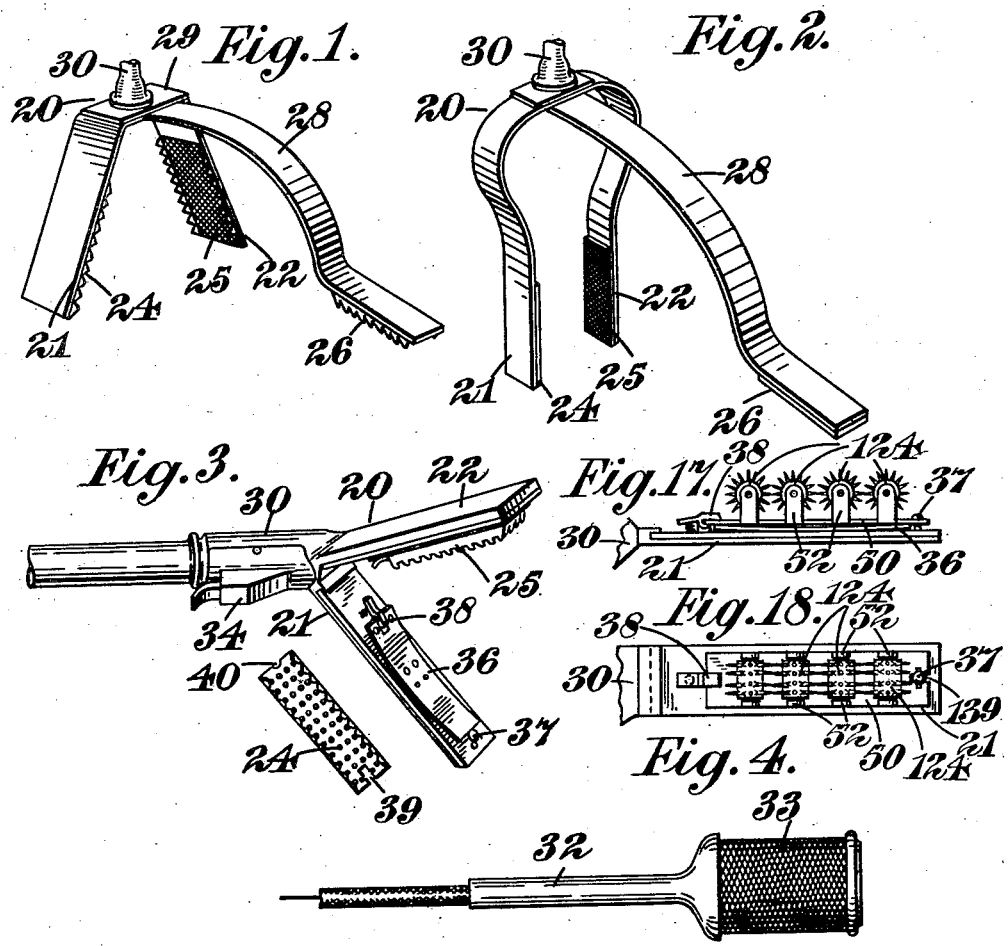
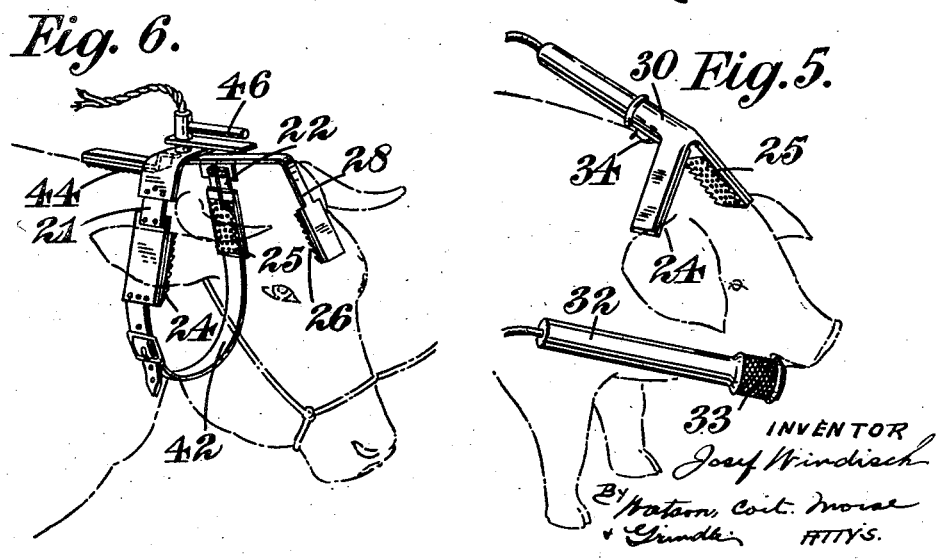

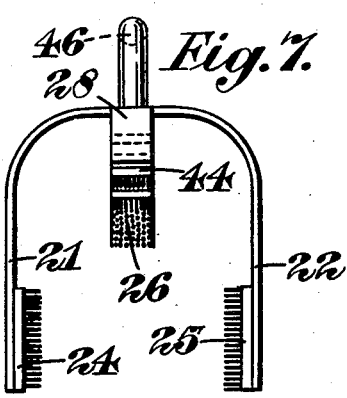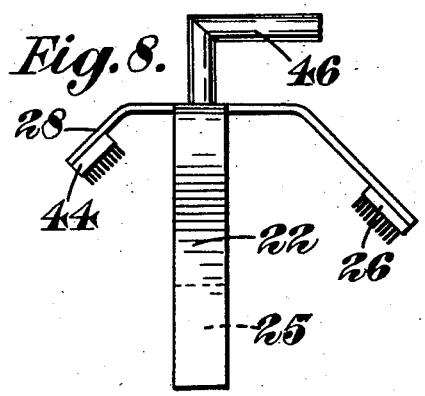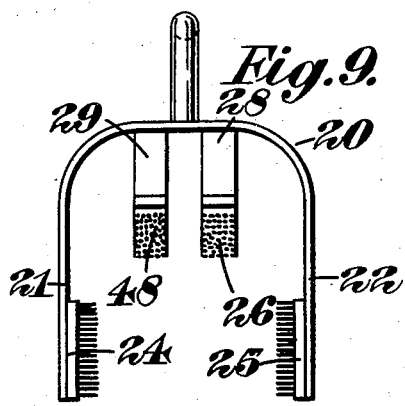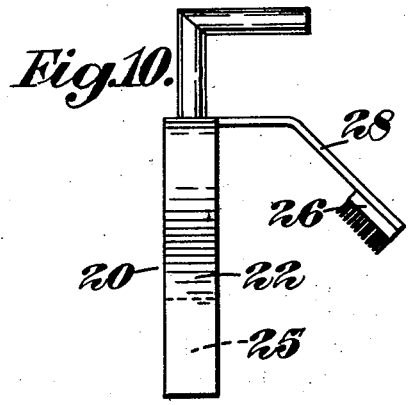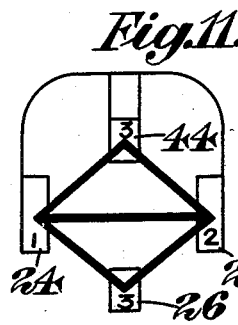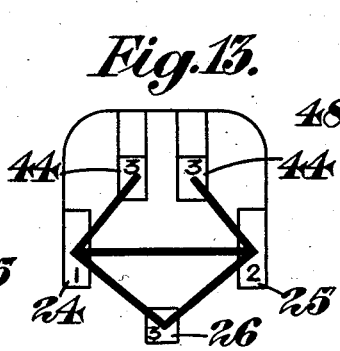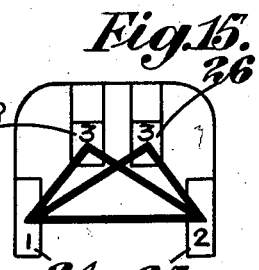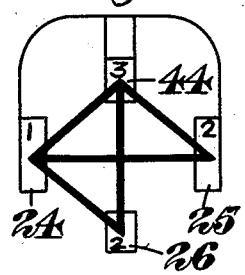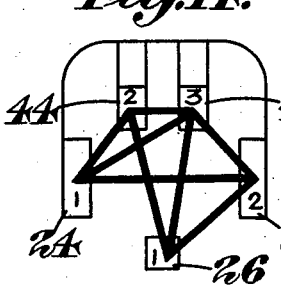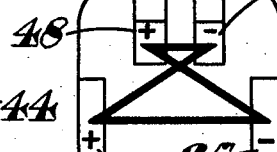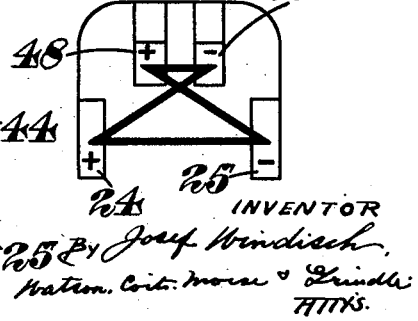

Patented Nov. 14, 1933

1,935,138

UNITED STATES PATENT OFFICE 1,935,138

APPARATUS FOR USE IN ELECTRICALLY STUNNING ANIMALS

Josef Windisch, Passing, near Munich, Germany, assignor to Industrial Waste Eliminators Limited, London, England, a British company Application October 12, 1932, Serial No. 637,524, and in Germany June 30, 1931

3 Claims. (Cl. 175—311)

This invention relates to apparatus for use in electrically stunning animals to be slaughtered, of the type wherein electrodes, between which a potential difference is to be applied, are arranged to be applied to and removed from the animal by hand, and to a method of using such apparatus.

The stunning of animals to be slaughtered, before drawing their blood, is an entirely justifiable humanitarian requirement. Beside shooting and percussive implements, stunning by means of an electric current is continually growing in importance because it is effected very surely and rapidly and involves the important advantage that not the slightest external injury is occasioned by it to the animal.

Heretofore, it has been proposed to provide an automatic plant having an endless belt, and electric contacts to be applied to the head of the animal as it was conveyed along a gangway by the belt. Such automatic plants with endless belts, however, are only suitable for very large scale conditions. It has also been proposed to use a manual appliance comprising a fork whereof the two prongs constituted one electrode, but this appliance was adapted only for use in killing pigs and other small animals.

The present invention has for one of its objects to enable animals, both small and large, particularly calves and large cattle, to be stunned more reliably than heretofore, by using a manual electrical appliance. Another object is to provide an improved construction of hand appliance having electrodes to be subjected to different potentials for use in stunning animals.

The first requirement for the free stunning of animals is that the latter, on the application of the electric contacts and the passage of the electric current, shall be dazed forthwith, that is to say, shall not move backwards or the like.

The invention provides an improved method of electrically stunning animals by using at least four electrodes for connection to different phases of a three-phase current supply manually applied to the animal, comprising the steps of placing two of the electrodes at opposite sides of the animal's head, and at least two additional electrodes each at a situation spaced away therefrom in the fore-and-aft direction of the animal so as to cause at least two currents to flow between two pairs of electrodes along paths which pass through the animal's brain when the electrodes are subjected to potential differences. It is found in practice that improved results are obtained when the electric current flows transversely through the brain from side-to-side as compared with those obtained by using the known manual appliances.

According to a feature of the invention, the electrodes may be so connected to the three phases of a three-phase current supply that two current paths intersect in the animal's brain, thereby ensuring still more rapid and reliable results.

The invention also provides apparatus of the type described for use in electrically stunning animals to be slaughtered, comprising in combination a support, at least four electrodes insulated from one another and carried by the support, means for subjecting the electrodes to potential differences, two of which electrodes are arranged to be manually placed one at each side of the animal's head, so that current flowing between them, will pass through the animal's brain from side to side thereof, as distinct from obliquely, or in the front-to-rear direction or the reverse, and at least two other electrodes are arranged to be manually applied to the animal each at a situation spaced away from said two electrodes in the fore-and-aft direction of the animal.

Preferably, the electrodes are arranged in pairs, the electrodes of each pair being subjected to a potential difference, and the current paths of the two pairs of electrodes intersect in the animal's brain.

In a preferred arrangement, two electrodes are arranged to be placed one at each side of the animal's head, and the two electrodes of another pair are arranged at opposite sides of the support carrying the first mentioned pair.

Alternatively, the electrodes of the second pair may be arranged at the same side of the support carrying the first mentioned pair.

Conveniently, the support carrying two of the electrodes is of inverted U-shape, and constitutes a fork, on the prongs of which the electrodes are insulatedly mounted, and the additional electrodes may be mounted on one or more rods carried by said fork at the closed end thereof and extending out of the plane of the fork.

If desired, two electrodes may be carried on rods at one side of the fork, and a fifth electrode on a rod at the opposite side thereof.

The invention also provides for use in manual apparatus for electrically stunning animals to be slaughtered, an electrode in the form of a radially pointed rotary member mounted to rotate about an axis lying transversely of the direction of length of a longitudinal support carrying it.

In some cases an electrode may comprise a plurality of radially pointed rotary members arranged side by side to rotate about parallel axes.

Such rotary electrodes may be detachably mounted on, but insulated from their support, for example the prong of a fork aforesaid or a rod carried by the fork.

Several forms of apparatus adapted for carrying into practice the improved method of stunning animals are illustrated by way of example in the accompanying drawings, wherein:

Figures 1 and 2 are perspective views, showing two different forms of manual appliance for use in slaughtering animals, and Figures 3 and 4 are like views showing a third form, Figure 5 shows the third form in use, Figure 6 is a perspective view of a fourth form of manual appliance according to the invention, Figures 7 and 8 are rear and side elevations respectively showing a modified form similar to that shown in Figure 6, Figure 9 is a front elevation of another form, Figure 10 is a side elevation of yet another form, and Figures 11 to 16 are diagrams showing in heavy lines current paths provided with various forms of appliance according to the invention;

Figures 17 and 18 are side elevation and plan view respectively showing a modified form of electrode according to the invention.

Like reference characters designate like or similar parts throughout the several views.

Referring first to Figure 1, a manual appliance for use in electrically stunning animals to be slaughtered, has a support or frame which comprises a forked member 20, of inverted V shape, whereof each of the prongs 21, 22 constitutes or carries an electrode 24, 25 respectively, and a rod 28 extending out of the plane of the forked member has one end connected to the latter at the top member 29 of the inverted V, the other end of which rod 28 constitutes or carries an electrode 26. A handle member 30, shown broken away is secured to the forked member at the closed end 29 of the V where the rod 28 is attached to the same, which handle 30, may be hollow for passing electrical conductors through the same to the three electrodes. Such an appliance is suitable for use with small animals such as pigs and sheep. The fork can be readily placed on the nape of the neck behind the ears of the animal, while the said rod can be held against another part of the head in front of the fork.

The appliance shown in Figure 2 differs from that just described with reference to Figure 1 in that the fork 20 is of U shape and has curved prongs 21 and 22 so that it is more resilient and can be applied to animals of different sizes.

Figures 3 and 4 show an appliance comprising a fork 20 having two electrodes 24, 25, and a hollow rod 32 that is distinct from the fork and carries the third electrode 33, constituted by a cylindrical brush or the like which can be placed at any convenient distance in front of or behind the fork straddling the animal's head or neck as illustrated in Figure 5. A single or double pole switch 34 may be provided on the handle member 30. The electrodes 24, 25, 26, may be of any convenient construction for example of serrated metal. Alternatively, an electrode may have the form of a metal brush and may be made of brush-like metallic fabric or the like.

As shown in Figure 3, for readily removing and replacing a brush 24 constituting an electrode, a resilient strip of metal 36 may be mounted on but insulated from the prong 21. A headed stop pin 37 may be provided on the prong at one end of the strip 36, and a spring pressed catch 38 at the other. The brush 24 may have at one end a recess 39 for receiving the shank of the pin 37, and at its other end a positioning notch 40 for co-operating with the catch 38 when the brush is in position on the strip 36 which makes electrical contact with the back of the brush. Leads passed through the handle member may be connected by way of the switch 34 in any convenient manner to the strip 36 which, together with the pin 37 and catch 38, are insulated from the prong 21. When such brushes are used in the method set forth above, the appliance may be placed on the animal's head with a brushing movement to ensure making effective electric contact with the animal's skin. When moved in this way on the animal, the brushes sweep over the hairs, bristles or the like on the skin of the animal and arrange them in the direction of movement of the brush, so that the fine, movable, metallic points of the bristles of the brush contact with certainty with the skin itself and effect a good electrical contact. As the electric current issues intensively out of the points of the bristles the current density on the skin at the bristle-points is considerable and an improved action results.

When the larger animals are to be dealt with, for example cattle and calves, the support may be in the form of a head stall or band, and as shown in Figure 6 it may comprise two rectilinear side members or prongs 21, 22, which are connected by a band 42, and whereon two electrodes 24, 25 are mounted to lie at opposite sides of the brain of the animal, a third electrode 26 being carried by a bar 28 attached to the fork at its closed end for application to the forehead of the animal, and a fourth electrode 44 being carried by an extension of the bar 28 at the rear of the fork. Such an appliance may carry a shade arranged to cover the eyes of the animal, but this is usually unnecessary. A handle member 46, which may be the handle member of a switch controlling the supply of current, e. g. three-phase current to the electrodes, may be provided on the fork at its closed end.

The appliance shown in Figures 7 and 8 is similar to that illustrated in Figure 6, but differs therefrom in that the band 42 is omitted, and the forked portion of the support carrying the electrodes 24 and 25 is of inverted U shape. Also the rear portion of the bar 28 carrying the electrode 44 is bent angularly somewhat instead of being linear.

Referring to Figure 9, the fork 20 of inverted U shape carrying the electrodes 24 and 25, has two bars 28, 29 extending forwardly from it and carrying each an electrode in the form of a brush 26 and 48 respectively.

Figure 10 shows a construction comprising a fork 20 having two electrodes and a bar 28 carrying a third electrode 26. In some cases this front electrode may be duplicated as shown in Figure 9. As indicated in broken lines in Figures 9 and 10, a rear electrode 44 may be used in these constructions, and in some cases the rear electrode 44 may be duplicated to provide two electrodes at the rear of the fork similar to the two at the front.

The three, four or five electrodes of the appliances described above may be connected in various ways to the three phases of a three-phase electric supply as indicated diagrammatically in Figures 11 to 15, wherein the numerals 1, 2 and 3 applied to the electrodes indicate the different phases to which the latter are connected.

In some cases continuous current of sufficiently high tension may be employed with the appliances shown in Figures 6 to 10. As shown in Figure 16, the electrodes 24 and 48 may be connected to the positive main and the electrodes 25 and 26 to the negative main, or reversely.

Instead of using a flat electrode 24 in the form of a brush, as described above, a rotary electrode may be employed. Referring to Figures 17 and 18, a metallic base plate 50 has at one end a recess 139, and at its other end a positioning notch to enable it to be mounted on the fork 20 in the same manner as a brush 24. This base plate 50 carries a plurality of pairs of bearings 52 in each of which is journaled a rotary member 124 having radially directed points, spikes or bristles for passing between the hairs of the animal and effecting good electrical contact with its skin. It is found that the action of such rotary electrodes is better than that of the flat brush-like electrodes shown in Figures 1 to 3 and 6 to 10.

If the current is too intense and the voltage is too high when it is first switched on, the animals may collapse instantaneously. It is preferable to obviate this drawback because fractures of bones, particularly of large animals, may occur and other drawbacks are liable to result. Preferably, the current passed between the electrodes is first so weak as to cause the animal to collapse slowly, and is then increased, without removing the appliance from the animal, to the full strength necessary for completely and rapidly stunning the animal, for example when it is lying on the ground. This can be done by using a transformer having two switches, one for providing current at a low voltage, say about 40 volts, and the second for current at higher voltage, say about 80 volts.

I claim:—

1. Manual apparatus for use in electrically stunning animals to be slaughtered, comprising in combination a fork, two electrodes each comprising a metal base detachably mounted on but insulated from a prong of the fork, a plurality of bearings on said base, and a plurality of radially pointed rotary members arranged side by side and journaled in said bearings, and means for subjecting the electrodes to a potential difference.

2. In apparatus for use in electrically stunning animals, the combination with two pairs of electrodes, of means for simultaneously energizing the electrodes of each pair to establish potential differences therebetween, and means for supporting said electrodes in spaced relation with two of said electrodes contacting opposite sides of the head of the animal and the remaining two electrodes contacting the head of the animal at points so chosen that some straight lines connecting electrodes of different potential will intersect in the brain of the animal, whereby the greatest current intensity will tend to be localized at some point in the brain.

3. Apparatus for use in electrically stunning animals to be slaughtered, comprising in combination supporting means, two pairs of electrodes insulated from one another and carried by the supporting means, and means for subjecting the electrodes of each pair to potential differences, said supporting means serving to maintain the electrodes of one pair at opposite sides of the animal's head and the electrodes of the other pair at points spaced longitudinally of the animal's head, the electrodes being so located that straight lines drawn between the electrodes of each pair will intersect in the brain of the animal, whereby the greatest current intensity will tend to be localized at some point in the brain.

JOSEF WINDISCH.